United States Patent
Stopford et al.

(10) Patent No.: US 12,367,024 B2
(45) Date of Patent: Jul. 22, 2025

(54) APPLICATION TO CONTAINER CONVERSION AND MIGRATION

(71) Applicant: Cristie Software Ltd, Stroud (GB)

(72) Inventors: Jordan Stopford, Stroud (GB); Sam Kendall, Stroud (GB); James Reynolds, Stroud (GB); Ian Cameron, Stroud (GB)

(73) Assignee: Cristie Software Ltd (GB)

( * ) Notice: Subject to any disclaimer, the term of this patent is extended or adjusted under 35 U.S.C. 154(b) by 7 days.

(21) Appl. No.: 17/840,577

(22) Filed: Jun. 14, 2022

(65) Prior Publication Data

US 2022/0398077 A1 Dec. 15, 2022

(30) Foreign Application Priority Data

Jun. 15, 2021 (GB) .................................. 2108502

(51) Int. Cl.
| | |
|---|---|
| *G06F 8/51* | (2018.01) |
| *G06F 8/41* | (2018.01) |
| *G06F 8/61* | (2018.01) |
| *G06F 8/76* | (2018.01) |
| *G06F 9/50* | (2006.01) |

(52) U.S. Cl.
CPC ............... *G06F 8/51* (2013.01); *G06F 8/433* (2013.01); *G06F 8/61* (2013.01); *G06F 8/76* (2013.01); *G06F 9/5088* (2013.01)

(58) Field of Classification Search
CPC ... G06F 8/51; G06F 8/433; G06F 8/61; G06F 8/76; G06F 9/5088
USPC ....................................................... 717/137
See application file for complete search history.

(56) References Cited

U.S. PATENT DOCUMENTS

| | | | |
|---|---|---|---|
| 8,359,593 B2* | 1/2013 | Golosovker ............ G06F 12/08 718/1 |
| 2008/0139191 A1* | 6/2008 | Melnyk ................. H04L 67/565 707/E17.121 |
| 2009/0138855 A1* | 5/2009 | Huene ....................... G06F 8/75 717/125 |
| 2010/0005014 A1* | 1/2010 | Castle .................... G06Q 10/10 705/30 |
| 2012/0011498 A1* | 1/2012 | Govindaraju ............. G06F 8/61 717/178 |
| 2012/0030680 A1* | 2/2012 | Chang ................. H04L 41/5051 718/102 |
| 2012/0046069 A1* | 2/2012 | Cupala .................... H04W 4/60 455/550.1 |
| 2013/0311603 A1* | 11/2013 | Wang .................. H04L 67/1095 709/217 |

(Continued)

OTHER PUBLICATIONS

Search Report, GB2108502.2, Mar. 2, 2022, Patent Act 1977: Search Report under Section 17(5), Great Britain Intellectual Property Office.

*Primary Examiner* — Bradford F Wheaton
(74) *Attorney, Agent, or Firm* — Invention To Patent Services; Alex Hobson

(57) ABSTRACT

A method and system is disclosed for migrating an application on a source computer system, which may be a legacy application running on an out-of-date operating system, to a container host running on a target computer system. The system includes software products which analyse the source system to identify application components, and which provision containers corresponding to the identified components.

13 Claims, 1 Drawing Sheet

(56) References Cited

U.S. PATENT DOCUMENTS

| | | | |
|---|---|---|---|
| 2014/0019941 A1* | 1/2014 | Funke | G06F 3/04842 |
| | | | 717/124 |
| 2016/0197779 A1* | 7/2016 | Soejima | G06F 8/20 |
| | | | 709/222 |
| 2016/0330277 A1* | 11/2016 | Jain | H04L 67/1095 |
| 2017/0257424 A1* | 9/2017 | Neogi | H04L 47/781 |
| 2019/0347127 A1 | 11/2019 | Coady | |
| 2019/0391960 A1* | 12/2019 | Luo | G06F 16/178 |
| 2021/0049002 A1* | 2/2021 | Myers | G06F 8/656 |
| 2021/0141904 A1* | 5/2021 | Gauthier | G06F 21/577 |

* cited by examiner

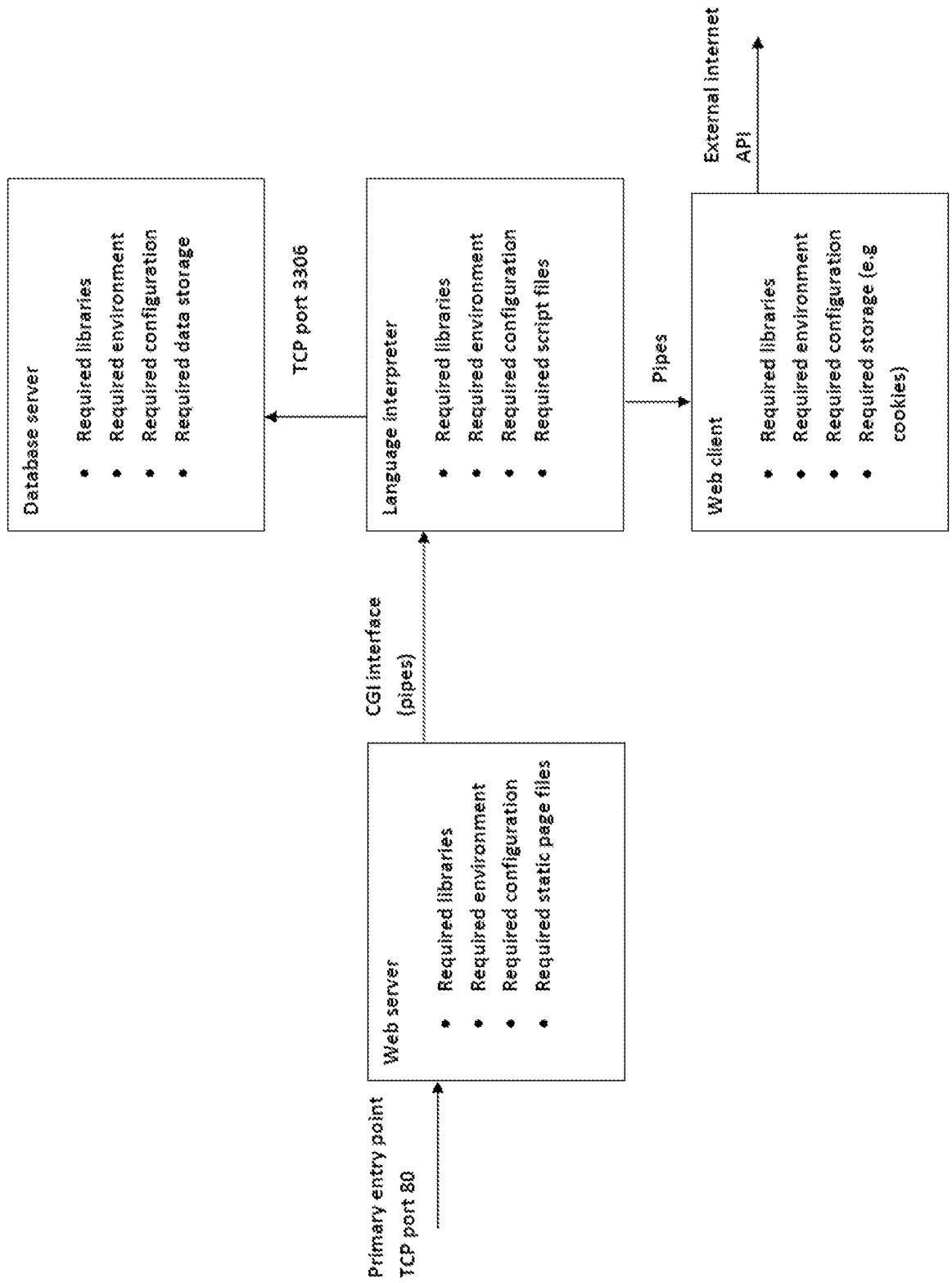

APPLICATION TO CONTAINER CONVERSION AND MIGRATION

CROSS REFERENCE TO RELATED APPLICATIONS

This application claims the benefit of priority to GB2108502.2, filed on Jun. 15, 2022 and currently pending; the entirety of which is hereby incorporated by reference herein.

BACKGROUND OF THE INVENTION

Field of the Invention

The present invention relates to migration of a software application from a source computer system to a target computer system. In particular the invention provides methods for automatically or semi-automatically converting an application into a containerised structure for migration to a modern environment.

Background

Many organisations today rely on a large number of "legacy applications". Broadly, a legacy application may be said to be a computer system which works and provides a useful (possibly critical) business function, but relies on technology which is no longer current.

An "application" may comprise a number of interrelated components, for example database servers, web servers, runtime engines, etc. An application may be running on a single server or across multiple servers.

The continued use of legacy applications can present a number of problems. Firstly, legacy applications may be running on old hardware. Replacement parts may no longer be available and so in the event of a failure, repair may not be possible. Even if the hardware can continue to function reliably, the power consumption and requirement for cooling associated with older hardware is likely to be greater than for modern hardware. Many organizations are looking to eliminate or at least significantly reduce on-site servers in favour of the use of the "cloud" in order to outsource some aspects of infrastructure management and take advantage of, for example, highly robust redundant power and network connections, 24 hour security, etc. which would be prohibitively expensive for small or medium businesses, but which can be provided efficiently when the cost is shared by many customers of a large datacentre or hosting provider. However, legacy applications which rely on old hardware may be a significant barrier to completion of such projects.

More importantly, legacy applications may rely on old versions of software, especially unsupported versions of operating systems. Continuing to run unsupported operating systems represents a significant security risk due to the inevitable presence of unpatched security vulnerabilities. This can sometimes be managed to an extent by isolating the unsupported systems and setting up well-defined and secure access to them, but this will never completely solve the security problem and may compromise usability. The problem is not limited to operating systems but may include, for example, old versions of database management systems, web servers, and indeed any other software.

Old hardware, and old versions of operating systems and other software may also not be compatible or not completely compatible with, for example, backup systems, monitoring software, UPS devices and so on. This leads to a significant ongoing management burden associated with legacy applications, which may require for example bespoke and manual backup procedures separate from an organization-wide centralised backup system, or regular manual checking that all components are still working (for example, no disks in a RAID array have failed) where centralised monitoring and alerting cannot be relied on.

Another problem associated with legacy applications is that the architecture of the application can be unclear and unknown. An "application" could comprise of a complex set of interrelated components running on one or more computers which may communicate with each other in different ways. For example, multiple components might access a shared database directly, while other components may access data by requesting it through a service provided by another component. The structure and dependencies of the application may be undocumented or partially documented. Dependencies of components of the application on particular configuration options or particular versions of libraries may be unclear. Ongoing maintenance may depend to a large extent on personal knowledge of individuals, and this knowledge is prone to loss with staff turnover. This makes diagnosis and repair of any faults potentially difficult and time-consuming.

Virtualization is a relatively simple solution in many instances to the problem of out-of-date hardware. The contents of an old physical server can be imaged and run on a virtual machine, often with minimal or no modification. Virtualization eliminates reliance on old hardware, may help, at least to some extent, with the problems of compatibility with modern backup systems (since the virtual machine at least can normally be imaged and backed up as a whole), and may allow the legacy application to take advantage at least partially of modern power management and monitoring associated with the modern hardware on which the virtual machines run. However, it does not address the most significant security problems associated with out-of-date and unsupported software.

Containerization involves bundling up a particular service into a single executable package which includes all required configurations, libraries and dependencies. Each container communicates with other containers only via well-defined interfaces. Building an application as a series of isolated containers therefore makes it easier to understand, troubleshoot and maintain. Containerization is sometimes known as "OS-level virtualization" and containers are portable across operating systems and operating system versions. Operating systems can therefore be kept up-to-date and the containers in principle should continue to work unaffected. However, although containerization as a concept has been known for a long time, it has only really become common in the past 10 years. It is likely therefore that many "legacy" applications will not be structured in this way.

Full migration of an application to a modern platform is therefore a time-consuming and manual process, which for large projects may involve a team of skilled people. The environment essentially needs to be re-built from scratch, using modern versions of the operating system and other required components (database servers, web servers, etc.). As part of this process the application may be containerized to make it more maintainable in the future, but correctly building and configuring each component in the container still requires identifying the required dependencies and configurations. Without full knowledge of how the legacy application works, this may involve a certain amount of trial and error. The time required and therefore the cost of such a migration project may be difficult to accurately estimate in advance. Some projects may prove unmanageable within available budget and may end up being abandoned altogether.

Preferably a container is built with a minimal set of dependencies—in other words the component (for example a web server) in the container does not have any packages installed or any interfaces enabled which it does not need. The person doing the migration could take the view that anything which was installed or enabled in the legacy application ought to be installed and enabled in the new container, but this will lead to a less efficient, less maintainable, and less secure result. Best practice is to only install what is required, but exactly what is required may be unclear without significant work.

It is an object of the present invention to reduce or substantially obviate the aforementioned problems. In particular it is an object of the invention to provide an automatic software-driven system for legacy application migration which provides a more complete, durable and modern result than simply virtualizing an application to take it off old hardware, but without the significant cost, time and uncertainty associated with a "re-platforming" performed manually.

SUMMARY OF THE INVENTION

According to the present invention there is provided a computer-implemented method of migrating an application from a source computer system to a target computer system, the method comprising the steps of:
  (a) identifying a primary entry point provided by the application on the source computer system;
  (b) examining the application on the source computer system to determine an executable program which provides the entry point;
  (c) defining an application component by identifying internal and external entry points used and provided by the program;
  (d) recursively carrying out steps (b) and (c) for each of the internal entry points identified as used in step (c), until there are no internal entry points associated with any components which are not provided by another component;
  (e) provisioning a container on the target computer system for each application component.

An entry point is an interface. For example, an entry point may be a network port or API endpoint. The application will have at least one external entry point, i.e. an interface to something which is not defined as part of the application. Some applications may have more than one external entry point. The application is likely to include multiple internal entry points, i.e., interfaces between components which are part of the application.

For each application component identified, a list of dependencies associated with the executable program may be identified. The dependencies may include for example packages and libraries required by the program and/or persistent configuration storage required by the program.

The effect of the method of the invention is to break the application down into small components. A component is defined as the immediate executable program which provides an entry point to the component, and everything which that component needs in order to run—its dependencies. Thus, once the application is broken down into small components, each component is built back up to include a minimal but complete set of everything which it needs in order to run. In different embodiments, each component may be "built back up" (by identifying a minimal but complete set of dependencies) as it is identified, or alternatively all of the components may be identified by building a complete map of components and internal entry points between components before each component is then built back up to include everything it requires.

For each component, entry points, i.e., interfaces which the component needs to have with other components, are identified. These entry points are recorded in a list associated with the component.

An entry point will be identified either as external or internal—whether it is an interface to another component of the application or whether it is an interface to an external system or another application. Some interfaces, for example a web server which is accessed by users on client machines, may be obviously external interfaces. In other cases, the difference between an "internal" and "external" interface may simply depend on what is defined as "part of the application" and what is defined as a "different application", which may depend on the wider context and in particular the status of different parts of the estate as "legacy". For example, an interface to another computer system which is already running in a modern virtualized and containerised environment in the cloud, on an up-to-date operating system, would probably be considered a different application since it does not need to be migrated. However, where there are multiple legacy applications all of which interact and all of which need to be migrated to a more modern environment, the boundaries between applications may be considered a matter of engineering discretion. Therefore, although the method is to a large extent automatic and driven by software, defining the ultimate bounds of the application and therefore the difference between an external and internal entry point may be a matter of user input.

In one embodiment, an application is considered to be all the intercommunicating parts which run on a single machine (whether the machine is a physical machine or a virtual machine). An internal entry point is therefore defined as an interface to another component on the same machine (physical or virtual), and an external entry point is defined as an interface to a component on a different machine. The component on the different machine is considered as part of a different application. This embodiment provides a highly-automated method of containerisation, since no user input is required to define the boundaries of the application. In addition, it is applicable and useful for many legacy applications which are installed, often on virtual machines.

Note that in such an embodiment, it is possible for multiple applications to be on the same machine. The "application" is all parts which are connected to the primary entry point via internal entry points. Another application may be on the same machine but if it does not communicate with the first application, or if it communicates only via processes running on different machines, then it will be considered as a separate application, and could be migrated separately by the method of the invention, starting with its own primary entry point.

For each component, entry points will be identified which are used by that component and entry points will also be identified which are provided by that component. Where a component uses an internal entry point which is not provided by any yet-identified component, steps (b) and (c) need to be recursively carried out to define a component to provide that entry point. When there are no internal entry points left which are used by some component but not provided by another component, all components of the application have been identified.

Once all components of the application have been identified, any entry points which are provided by a component but not used by any other component may be examined to determine whether they are required external entry points of the application, or whether they are redundant entry points. A redundant entry point, i.e. an interface to a component which exists as a result of how the source system was configured, but which is not required by any internal component or external application or user, may represent an unnecessary security risk. Therefore, any components having redundant entry points may be re-defined to omit that entry point.

Hence there is a recursive process of building a map of components and entry points, until there are no entry points used by any components which are not either provided by other components or defined as external entry points used or provided by the application.

Identifying the primary entry point may include scanning the source system for known types of service files. However, some manual intervention may be required to identify the primary entry point(s) associated with an application, based on the services which the application is known to provide. Some applications may have multiple primary entry points in which case step (b) is carried out (and recursed) for each primary entry point.

At step (b), identifying the executable program which provides the entry point may be done by examining the application when it is running on the source computer system, in particular identifying which running process is bound to the entry point, for example the network port or pipe. Service files may be examined to determine, in addition to the executable program which provides the process, any arguments or environment variables which need to be passed to it.

Determining entry points used and provided by a component may be done by examining the respective computer program when it is running on the source system and observing how it interacts with, for example, TCP ports, UDP ports, pipes, etc.

Determining the list of dependencies may include determining which binaries and libraries are required by the program. This is achieved by examining which binaries and libraries are installed alongside the application via package files on the source system. Additionally, the source system may be examined to determine any system libraries utilized by the program.

It will be understood that determining binaries and libraries which are required may include recursively building a dependency tree. i.e. dependencies of dependencies are all included in the list of dependencies associated with an executable program which forms one component. Although the list of dependencies is built by starting with one executable program, there is not necessarily only one executable program per component since the executable program may depend on others.

Each defined component corresponds to one container to be provisioned on the target system. It is quite possible that some binaries and libraries will form part of multiple components/containers. Each container includes a minimal but complete set of executable programs, libraries and configuration which provide the services required by the entry points at the boundary of that container.

Determining the list of dependencies may include identifying files in persistent storage. This may be done by examining the computer program when it is running on the source system and observing which files are accessed and changed by the program.

Provisioning each container may include selecting a container base image from a library of container images. Container images are likely to be available including up-to-date versions of web servers, database servers, etc. A container base image may be selected which includes a subset of the programs and libraries which are identified as part of an application component. The container image may then be modified to include anything which the application component requires which was not part of the container image.

The source and target computer systems are assumed to be ABI (application binary interface) compatible. The target computer system may be a virtual machine (indeed it is likely that the target computer system will usually be a virtual machine) and so an ABI-compatible target computer system may easily be provisioned.

The method may further include provisioning network connections between containers on the target computer system. Each container will require internal network connection(s), allowing communication with one or more other containers, and at least one container, probably multiple containers, will require an external network connection where an entry point/interface to the application as a whole is provided. Network connections on the target system are provisioned according to the entry points identified as needing to be associated with each component.

Storage volumes for container(s) to hold persistent data may be provisioned on the target system according to the persistent configuration storage identified as needing to be associated with each component. Containers are inherently ephemeral and so any files which are determined to be critical for persistence are externalized from the container as volumes which are attached to the relevant container.

A startup script may be created for each container, or for at least some of the containers. The startup script may for example set up environment variables when the container starts, or pass arguments to the executable program according to the requirements identified on analysis of the source system.

Migrating the application to the target system may further include copying data from the source system to the target system. Data copied may include package files and libraries.

Files being copied may be scanned for source-system-specific configuration information. For example references to hostnames or IP addresses. If any of these references are found to map to services migrated as part of the application, they are changed to reference the internal container network names assigned by the container host on the target system.

A container orchestration script may be created. This is in effect an application-wide startup script, which ensures that each container is started in the right way and in the right order.

BRIEF DESCRIPTION OF SEVERAL VIEWS OF THE DRAWINGS

The accompanying FIGURE is included to provide a further understanding of the invention and are incorporated in and constitute a part of this specification, illustrate embodiments of the invention, and together with the description serve to explain the principles of the invention. For a better understanding of the present invention, and to show more clearly how it may be carried into effect, reference will now be made by way of example only to the accompanying drawing.

The FIGURE shows an example map of application components and entry points created and used by an embodiment of the invention a schematic of an embodiment of the invention.

DETAILED DESCRIPTION OF THE ILLUSTRATED EMBODIMENTS

An embodiment of the invention comprises computer software made up of an analysis module, a container provisioning module and a data migration module. The analysis module examines the source computer system to build up a map of application components and entry points between components. Further, the analysis module identifies all dependencies required by a component to form a minimal but complete runnable container to perform the function of that component.

The container provisioning module provisions containers on the target computer system according to the information collected by the analysis module. A container will be provisioned for each identified application component, and the appropriate interfaces will also be set up between the containers.

Provisioning a container may include identifying a suitable container base image. The container base image may have a subset of the programs required by the application component, with more programs/libraries to be installed to build a container to provide the component. In some cases, programs/libraries may be deleted from a container base image where they are not required by an application component. It is envisaged that container base images will normally be selected on the basis of having a fairly minimal installation of a particular program, for example a web server.

Finally, the data migration module copies the required files from the source computer system to the target computer system. Files being copied may be scanned to identify where configuration parameters need to be updated as part of the migration.

The starting point for the analysis module is to identify a primary entry point provided by the application on the source computer system. The primary external entry point may be defined by user input, but in embodiments an automated process may at least suggest likely primary entry points. For example, a web server port bound to a web server may well be a primary entry point, through which the application on the source computer system is accessed by users on client stations.

Given the primary entry point, the analysis module identifies the executable program responsible for providing that entry point. This is done by examining the source computer system when the application is running and looking at how executing processes interact with entry points. For example, a running process bound to a TCP port which has been identified as the primary entry point will be identified as associated with the executable program responsible for providing that entry point.

Preferably the source computer system is a single physical or virtual machine.

The identified program is then analysed while running on the source computer system to fully identify everything which is required in order for it to run. In this embodiment, this is done alongside identifying other entry points which are used or provided by the identified program. This process of fully defining everything which is required in the application component is referred to as "package analysis", and comprises of the following parts.

1. What Further Service(s)/Entry Point(s) does the Program Provide?

This is achieved by scanning the installation package associated with the program for known types of service files, e.g. Sysinit files or SystemD unit files. If none of these service files are found, a search is performed based on the binaries that are part of the package. Programs may be observed while they are running on the source computer system to see what network ports, pipes, etc. are bound to running processes.

Hence entry points are preferably identified by both static and dynamic inspection of the program on the source computer system.

2. How does the Program Provide the Entry Point(s)?

From any service file, e.g. Sysinit or SystemD unit file, it can be determined which binary needs to be run along with any arguments or environment variables which need to be passed to it.

3. What Binaries and Libraries does the Program Need to Run?

The package files are examined to determine what binaries and libraries are installed. Separately, the source system is examined to determine any system libraries which are required. This may be done recursively, to build a minimal but complete environment in which the program can function to provide the entry point(s) which it provides—the application component.

4. Which Entry Point(s) does the Program Need to be Available?

This is achieved primarily by examining the program when running within the source computer system to identify how it interacts with other components via interfaces (entry points) such as TCP ports, UDP ports, pipes, etc.

This allows a dependency map to be constructed between application components, and it ensures that all application components are identified, since the package analysis stage will be carried out recursively on all identified required entry points, until all required entry points are provided by some identified application component or are defined as external entry points, i.e. interfaces to some other system not defined as part of the application being migrated.

Preferably, external entry points are defined as entry points to some other system which is not part of the source computer system, e.g. which is run on a different physical or virtual machine.

5. What Storage does the Program Need for its Persistent Data?

This is achieved by examining files on the source system in well-known configuration locations (such as the/etc directory on Linux/UNIX systems). The program may be observed while running to determine what storage it interacts with.

The package analysis stage is carried out recursively on all identified internal entry points, and in this way a map of application components and entry points between the components is built up. Each application component is defined completely including all required system libraries, environment variables and persistent storage. However, the application component is minimal or close to minimal, in that it contains nothing which is not required to provide the entry point(s). The FIGURE shows a visualisation of the map of application components which may be built up for a simple application. Each box constitutes an application component. The arrows between boxes indicate entry points provided by one component (the component at the arrowhead provides the entry point) and used by another component (the component at the other end of the arrow uses the entry point). In this example a simple application is provided by a web server. A primary entry point is obviously the TCP port through which web clients connect. The web server program is identified and the package analysis takes place to fully identify everything required by the web server program, to define the component which can run in an isolated container. This includes all required libraries, environment and persistent storage for configuration and data. As part of the package analysis, it is determined that the web server uses a CGI interface, i.e. pipes to other processes running on the source system. The program providing this entry point is then identified, and the package analysis is completed in relation to this program as well. All required binaries, libraries, environment and persistent storage required by the language interpreter are determined, and it is also identified that when running on the source computer system, the language interpreter interacts with TCP port 3306 and also through pipes with other processes running on the source system. The programs providing these entry points (in this case, a database server and a web client) are then subject to the package analysis stage.

In this example the web client is observed to communicate with an external Internet service to retrieve information. This represents an external entry point, to a service which is not part of the application being migrated.

Although in this example the web client communicates with an external service on the internet, an external entry point is anything outside the source computer system, which in many embodiments is a single physical or virtual machine.

Once the analysis module has built a full map of application components, the container provisioning module can create containers on the target computer system ready for data transfer. The container provisioning module performs the following actions:

1. Create Empty Containers on the Target Computer System

For each container (a container is provided for each application component) a base image for the container is selected. Preferably container base images are available in a container base image library which have minimalist installations of common programs, for example web servers. A container base image is selected having a subset of what the application component requires, with extra packages/libraries then being added where necessary according to what has been identified as required as part of the application component.

A container is provisioned for each application component identified in the analysis stage.

2. Create External and Internal Container Networks.

Internal (i.e. within the container host) network connections are set up to allow communication between containers. In the example shown in the FIGURE, the language interpreter needs a network connection to communicate with the database server. External (i.e. externally of the container host) network connections are also created if required. For example, the web server in the FIGURE needs an external network connection so that users can access it, and the web client in the FIGURE needs an external network connection so that it can access an internet API.

It should be noted that the external network connections may be to different networks. For example, the external internet connection required by the web client in the FIGURE will need to be to the internet, but the external network connection provided by the web server in the FIGURE could be for example to an internal company network having no (direct) connection to the internet.

3. Create Volumes for the Containers to Hold Persistent Data

The information determined by the analysis module includes files which are required by application components to store persistent data. These files are externalized as volumes and then attached to the containers, ensuring that the information persists when containers are stopped and started.

4. Create Startup Scripts to Run the Programs in the Containers

The commands extracted from the service files in the analysis stage, for example arguments or options, are moved into a separate script which is executed when the container starts. This script contains all environment variables, user variables and customizations which are required for the application component to function properly.

5. Create Service User Context to Run the Migrated Application

The analysis stage discovers which user contexts are used on the source system to run the application and access any files/folders/binaries/libraries it requires for normal operation. For each user encountered on the source system, a new service user context is created on the target, along with a mapping for use in the migration stage.

Finally, a data migration module copies raw data from the source system into the target system. The data may be altered as it is copied in order to make necessary changes arising out of the migration to a containerised environment.

The data migration module performs the following actions:

1. Copy the Files and Folders Required by the Application

Files and folders required by any component of the application are identified in the analysis stage and are now copied.

2. Alteration of Target Filesystem Permissions

The analysis stage identifies which user contexts are required to run which application components, and which user contexts are required to access particular files and folders. The target filesystem permissions need to be altered to change the ownership of files to map to the new service user context.

3. Alteration of Internal Network References

Data being migrated is scanned for references to known hostnames or IP addresses which the source system uses for communication. If any of these references are found to map to other application components being migrated, the references are changed accordingly.

The invention provides an automatic system which allows an operator to take an application that has been installed on one system, perhaps where there is little knowledge of the structure and decision process which was made when the application was written or installed, and move it into a containerised target system. This allows legacy systems to be moved off old operating systems into modern environments, especially into "cloud" environments, without the time and cost associated with attempting to manually rebuild the application.

The embodiments described above are provided by way of example only, and various changes and modifications will be apparent to persons skilled in the art without departing from the scope of the present invention as defined by the appended claims.

What is claimed is:

1. A method of migrating an application, the method comprising the steps of:
   a) providing a source computer system that is a server computer system and a target computer system that is a virtual machine, the source computer system having the application to be migrated to the target computer system, and the application being installed on the source computer system and running on the source computer system;

b) the source computer system identifying a primary entry point provided by the application on the source computer system, the primary entry point being an interface to an external system or another application;

c) the source computer system examining the application on the source computer system when the application is running on the source computer system to determine an executable program which provides the primary entry point;

d) the source computer system defining an application component by identifying internal and external entry points used and provided by the executable program, an internal entry point being an interface to another component in the application and an external entry point being an interface to an external system or another application;

e) recursively carrying out steps c) and d) for each of the internal entry points identified as used in step (d), until there are no internal entry points associated with any components which are not provided by another component; and f) subsequent to steps (a) to (e), migrating the application to the target computer system by provisioning a container on the target computer system for each application component.

2. The method as claimed in claim 1, wherein for each application component identified, a list of dependencies associated with the executable program is identified.

3. The method as claimed in claim 2, wherein the list of dependencies include packages and libraries required by the executable program.

4. The method as claimed in claim 2, wherein the list of dependencies include persistent storage required by the executable program.

5. The method as claimed in claim 2, wherein the list of dependencies are identified during step (ed).

6. The method as claimed in claim 2, wherein determining the list of dependencies includes recursively building a dependency tree.

7. The method as claimed in claim 1, in which redundant entry points are identified, and the application components having the redundant entry points are redefined to omit the redundant entry points.

8. The method as claimed in claim 1, in which identifying the primary entry point includes scanning the source computer system for known types of service files.

9. The method as claimed in claim 1, in which identifying entry points used and provided by the application components includes examining the application when it is running on the source computer system.

10. The method as claimed in claim 1, further including provisioning network connections between the containers on the target computer system.

11. The method as claimed in claim 1, further including provisioning volumes for persistent storage on the target computer system.

12. The method as claimed in claim 1, further including creating a startup script associated with at least one of the containers.

13. A computer program product comprising a non-transitory computer readable storage media storing computer executable instructions which when executed are adapted to carry out the method of claim 1.

* * * * *